April 5, 1960 D. L. CURTIS ET AL 2,931,691

MAGNETIC DRUM MEMORY SYSTEM

Filed Aug. 20, 1956 3 Sheets-Sheet 1

INVENTORS:
Daniel L. Curtis
Robert B. Larsen

By Seymour M. Rosenberg
Attorney

MAGNETIC DRUM MEMORY SYSTEM

INVENTORS:
Daniel L. Curtis
Robert B. Larsen

By Seymour M. Rosenberg
Attorney

INVENTORS:
Daniel L. Curtis
Robert B. Larsen

By Seymour M. Rosenberg
Attorney 2,931,691

MAGNETIC DRUM MEMORY SYSTEM

Daniel L. Curtis, Manhattan Beach, and Robert B. Larsen, Hawthorne, Calif., assignors, by mesne assignments, to Litton Industries, Inc., Beverly Hills, Calif., a corporation of Delaware Application August 20, 1956, Serial No. 604,947

17 Claims. (Cl. 346—74)

This invention relates to a magnetic drum memory system, and more particularly to a magnetic drum data storage memory system employing self-aligning magnetic transducers which engage the drum periphery and are energizable for storing intelligence information thereon.

In numerous electronic systems it is frequently necessary to store or remember intelligence information presented as a continuously variable electrical signal in time, and to play back the information at a subsequent point in time for comparison with other signals or for other operational purposes. In the fields of high speed digital computation, pulse code communication, and information correlation in particular, the foregoing storage requirements are further complicated by the fact that the stored information must be periodically presented at cyclically repetitive points in time, and with relatively short access times, the term access time being utilized in the art to denote the maximum interval which must be waited before the desired information is again presented at the output of the memory unit.

As a result of the foregoing factors, it has become common practice to employ as a memory unit a rotatable drum whose periphery is magnetizable, and a plurality of magnetic writing and reading transducers positioned adjacent the periphery of the drum for sequentially writing signals on the drum or for reading signals from the drum; the terms writing and reading respectively denote the conversion of applied electrical signals to magnetized cells on the drum, and the generation of electrical output signals corresponding to the magnetization of the cells passing beneath a transducer. For purposes of simplicity, the term recording will hereinafter be considered generic to both reading and writing operations, since in practice a transducer may be utilized to either read or write, as desired, and the functional use implies no structural difference.

In its most common form, a magnetic drum memory unit employs a drum whose periphery is coated with either iron oxide or nickel-cobalt, and one or more transducers which are spaced from the drum periphery by several thousandths of an inch. The transducers are also usually positioned axially, with respect to the drum, over one or more parallel tracks or channels on the drum, where the term track or channel denotes a reference circle on the drum periphery which continuously passes beneath the transducers associated with that particular track. In the prior art several different forms of magnetic transducers have been found acceptable for use with magnetic drums, the most common form being a horseshoe-shaped core of magnetic material which carries an electrical coil or winding remote from the core gap, the gap in the core being positioned adjacent the associated drum track. In writing signals on the drum, therefore, energization of the transducer winding creates a magnetic field at least part of which bridges the core gap by way of the adjacent drum periphery. Conversely, in reading signals from the drum, a portion of the flux produced by the magnetized cells on the drum channel bridges through the transducer core and thereby generates an electrical output signal in the associated transducer winding.

Although the magnetic drum memory systems of the prior art have performed satisfactory in most applications, they still have a number of serious limitations. Firstly, positioning of the transducers adjacent the drum is a time consuming and difficult operation, since the transducers must be positioned over the desired track on the drum, must be circumferentially spaced from other transducers on the same track to within a few thousandths of an inch, and must be radially spaced from the drum periphery within one or two thousandths of an inch. A second disadvantage of the prior art magnetic drum memories is that the magnetic drum must be precision ground so that its eccentricity or run-out is limited to several ten-thousandths of an inch, the reason for this requirement being that eccentricity causes the drum-to-head spacing to vary as the drum is rotated, which varies the recording resolution and magnetization, and amplitude modulates the playback signal.

Still other limitations of the prior art magnetic drum memories and their transducers are that their electrical efficiency is relatively low owing to the fact that a great deal of the magnetic field generated in the recording head is lost through fringing flux, and that their maximum resolution in terms of cell density per unit length of drum, and for a given signal-to-noise ratio, is relatively low because the magnetic flux which bridges the core gap is effective over a length of the drum surface which is considerably larger than the core gap itself. This latter disadvantage is in turn a function of the structure of the prior art heads, and the fact that the heads are normally spaced from the drum.

In the prior art, attempts have been made to avoid some of the above limitations through the development of a transducer which would actually ride on the surface of the drum. In general these attempts have been unsuccessful, however, since the heads have been constructed with multiturn coil windings which not only limit their maximum electrical efficiency, but engender a head whose mass, although reduced through miniaturization, is still relatively large. Consequently, the spring force which would be required to overcome even normal accelerations and keep the head in contact with the drum could be sufficiently large to cause the head to erode the magnetizable layer on the drum; conversely, if the force is reduced to eliminate this erosion, unacceptable head bounce results. Moreover, the construction of the miniaturized heads is complicated by having to wind fifty or more turns of wire on a miniaturized core, and by having to spring mount the core and simultaneously connect relatively fragile lead-in conductors to the coil wound thereover.

The present invention, on the other hand, provides a magnetic drum memory unit which obviates the above and other disadvantages of the prior art devices by employing transducers which require only circumferential alignment about the drum periphery and which include a remarkably small single-turn contact head which is held in contact with the drum surface by one or more conductive cantilever springs which also serve as the energizing conductors for the head. According to one of the basic concepts of the invention, the contact heads herein disclosed comprise a miniaturized U-shaped core with a single conductive strip filling the gap therein to serve as a single conductive turn for creating a magnetic field through the core. The head is then held in continuous contact with the surface of an associated drum by at least one conductive cantilever spring which also connects electrically to one end of the head's single-turn energizing conductor.

According to two different embodiments of the invention to be hereinafter shown and described, the head also may be cantilevered on a second conductive spring which connects electrically to the other end of the head's single-turn conductor, while in still another embodiment of the invention only a single cantilever mounting spring is employed, electrical connection to the other end of the head being made through a relatively sturdy conductive ribbon. In all of these embodiments both high electrical efficiency and exceptionally high recording resolution are provided through the combination of the single-turn head and the fact that the head is held in actual contact with the drum.

Another feature of the invention resides in the use of a cup-core step-down transformer in the transducer, since this permits the cantilever springs to be integral parts of the transformer's secondary winding, as described in detail hereinbelow, while simultaneously providing an impedance transformation between the impedance of the source of recording signals and the relatively low impedance of the actual recording head. In addition, the drum memory system of the invention also provides a novel transducer mounting bracket which is engageable in grooved transducer mounting stations spaced around the drum to provide automatic track alignment of each transducer. Inasmuch as the radial alignment of each head is automatically insured by virtue of its being a contact head, it therefore follows that only the circumferential spacing of the heads around the drum requires adjustment in assembling the drum memory unit of the invention.

According to still another feature of the invention, there is disclosed an exceptionally lightweight and compact drum unit for use with the contact transducers of the invention, the drum unit including a hollow hub whose periphery provides the requisite magnetizable surface, and an internally mounted drive motor whose rotor is affixed to the hollow hub. The use of this form of structure is enhanced by the use of contact transducers, since the transducers are capable of continuously following the drum periphery even if it deflects slightly in operation because of its hollow form. Moreover, the need for precision machining and aging the drum surface to eliminate minor eccentricities is eliminated.

It is, therefore, an object of the invention to provide magnetic drum memory units wherein the associated transducers are radially and axially alignable automatically with respect to the drum.

It is also an object of the invention to provide magnetic drum memory units which include magnetic transducers which continuously engage the drum surface to provide high efficiency-high resolution writing and play-back.

A further object of the invention is to provide magnetic transducers which include a single turn head electrically energizable through and mechanically mounted on one or more conductive cantilevered springs which maintain the head in continuous contact with the surface of an associated magnetic drum memory.

Another object of the invention is to eliminate the need for precision machining magnetic drum memories by providing a transducer having a recording head which continuously engages and follows the drum periphery, as the drum is rotated, without appreciably eroding the drum surface.

Still another object of the invention is to provide a compact and lightweight magnetic drum memory unit wherein the drum comprises a hollow hub which is driven by an internally mounted motor whose rotor is affixed to the drum.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 3:
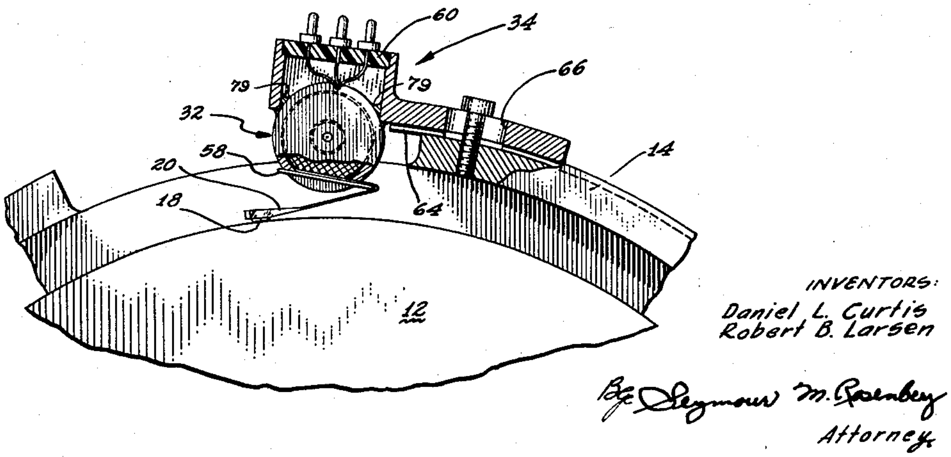
Fig. 3 is a plan view, partly in section, of one embodiment of a contact transducer, according to the invention, illustrating its principal elements and their operational relationships.
Figure 7:
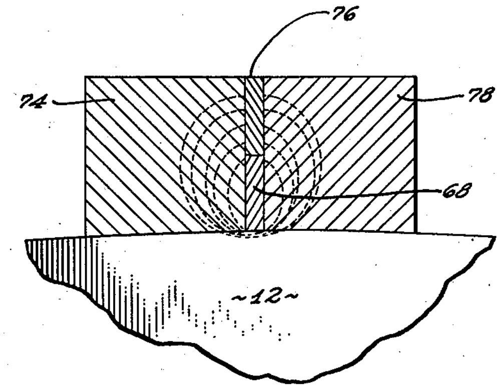
Figure 8A:
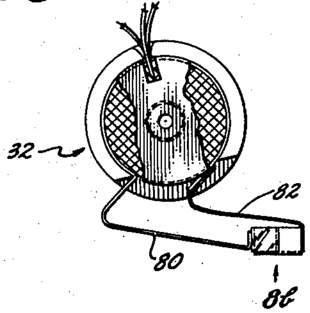
Figure 9A:
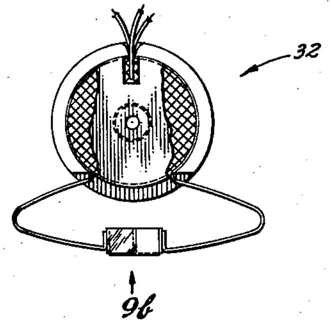
Figures 8B, 8C, 9B:
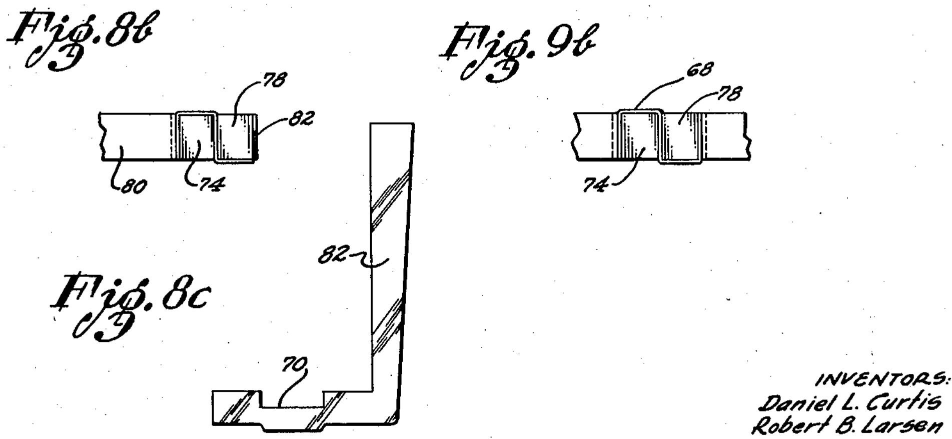

Figs. 4*a* through 4*e*, Fig. 5, and Figs. 6*a* through 6*f* are detail drawings illustrating the various elements in the transducer of Fig. 3, and the manner in which they are assembled;

Fig. 7 is a schematic diagram illustrating the manner in which the head elements in the transducers of the invention provide higher electrical efficiency and magnetic resolution;

Figs. 8*a* through 8*c* are diagrammatic views illustrating the construction of a modified embodiment of the transducer of the invention; and Figs. 9*a* and 9*b* are diagrammatic views illustrating the structural details of still another embodiment of the transducers of the invention.

Figure 1:
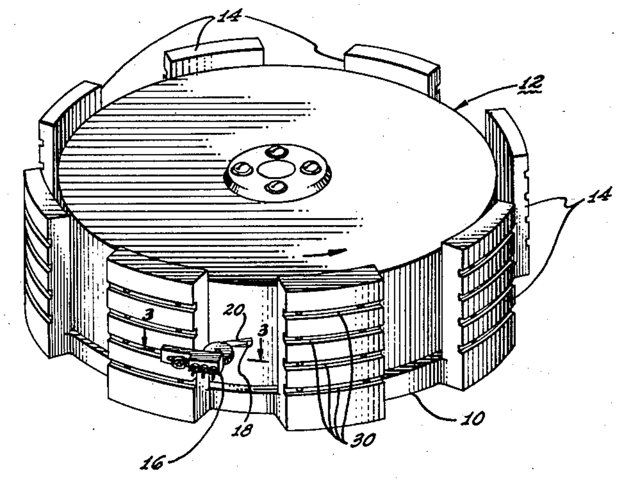
Fig. 1 is a perspective view of a magnetic drum memory system of the invention illustrating the operational relationship of the drum and one embodiment of a self-aligning contact transducer.

With reference now to the drawings, wherein like or corresponding parts are designated by the same reference characters throughout the several views, there is shown in Fig. 1 a magnetic drum memory unit according to the invention. Basically the memory unit comprises a stator or frame member 10, a rotatable drum 12 which is rotated by an associated motor, not here visible, a plurality of transducer mounting stations 14 which are preferably cast integrally with stator 10 and which are disposed about the drum periphery, and one or more magnetic transducers, such as transducer 16, which are mounted on preselected transducer mounting stations and which include an active recording or reading head 18 held in physical contact with the drum periphery by an electrically conductive cantilever spring assembly 20.

Figure 2:
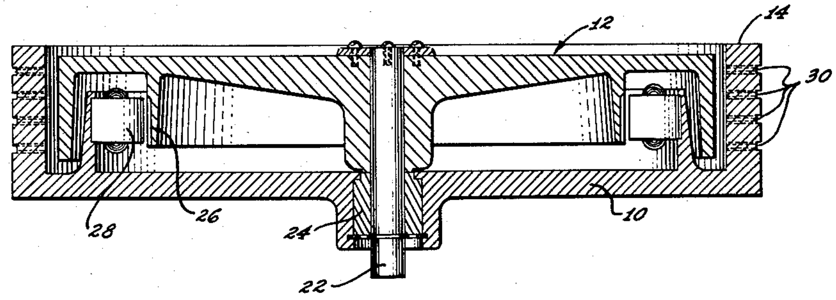
Fig. 2 is a cross-sectional view of the magnetic drum unit shown in Fig. 1 illustrating the manner in which it is driven.

Drum 12 is rotatably mounted on frame 10 by a shaft 22 and a bearing 24, as shown in the cross-sectional view of Fig. 2, and in accordance with the invention is preferably a hollow hub formed of aluminum or the like. As shown in Fig. 2, the drum also carries an integrally mounted hysteresis motor armature 26 which is operable in conjunction with a field winding 28 mounted on frame 10 for rotating the drum. The cylindrical periphery of the drum, or in other words, the surface of the drum adjacent the transducer mounting stations, is preferably plated with nickel-cobalt to provide a relatively low permeability magnetizable storage surface.

Referring once more to Fig. 1, each of transducer mounting stations 14 includes a plurality of peripheral slots 30 which are parallel to each other and to the direction of travel of the drum surface, each slot corresponding to a particular track on the drum surface and being aligned with a corresponding slot on each of the other transducer mounting stations. As will be described in more detail hereinbelow, slots 30 cooperate with guide tabs which are provided on the mounting brackets for the individual magnetic transducers, and thus assure automatic track alignment for the transducers. Inasmuch as the transducers employed in the drum memory of the invention actually contact the drum periphery, as described hereinafter in detail, it follows that the magnetic transducers are self-aligning and need only be adjusted in one dimension, namely circumferentially about the drum periphery.

Referring now to Figs. 4*a*–4*e*, there is shown a plan view, partly in cross-section, of a magnetic contact head or transducer according to the invention. As shown in Fig. 3, the transducer includes four basic components, namely, a cup-core transformer generally designated 32, a mounting bracket assembly generally designated 34, for mounting the transformer to a preselected transducer mounting station 14, the previously mentioned active read-write head 18, and a combined electrical conductor and cantilever spring 20 which constitutes one winding of the transformer and simultaneously provides electrical connections to head 18 and a resilient mechanical mount for forcing the recording head against the surface of drum 12. For purposes of clarity and for a better understanding of the invention, each of the foregoing parts of the transducer will now be described in more detail in conjunction with Figs. 4*a*–4*e*, 5, and 6*a*–6*f* which illustrate the various elements of the transducer and the manner in which they are assembled.

Referring now to Figs. 4*a* through 4*e* in particular, the cup-core transformer employed in the contact transducer of the invention comprises a pair of mating ferrite cup-cores 36 and 38, respectively, a center-tapped primary winding 40 wound on a bobbin 42 which in turn is encapsulatable with cup-cores 36 and 38, and a single turn secondary winding which in this embodiment of the invention comprises a resilient conductive strip 44, the ends of which are designated 20 and form the electrical and mechanical mounting elements for the transducer's recording head. It is apparent from the foregoing functions performed by the transformer secondary winding that the material from which it is made must have relatively high conductivity and still provide sufficient resiliency for spring-loading the associated recording head against the drum. In practice it has been found that a three-mil thick strip of either copper or beryllium copper may be utilized, beryllium copper being preferred if resiliency is of paramount importance in a given application, whereas copper is preferred if maximum head energizing current is desired.

Figures 4A, 4B, 4C, 4D, 4E, 5:
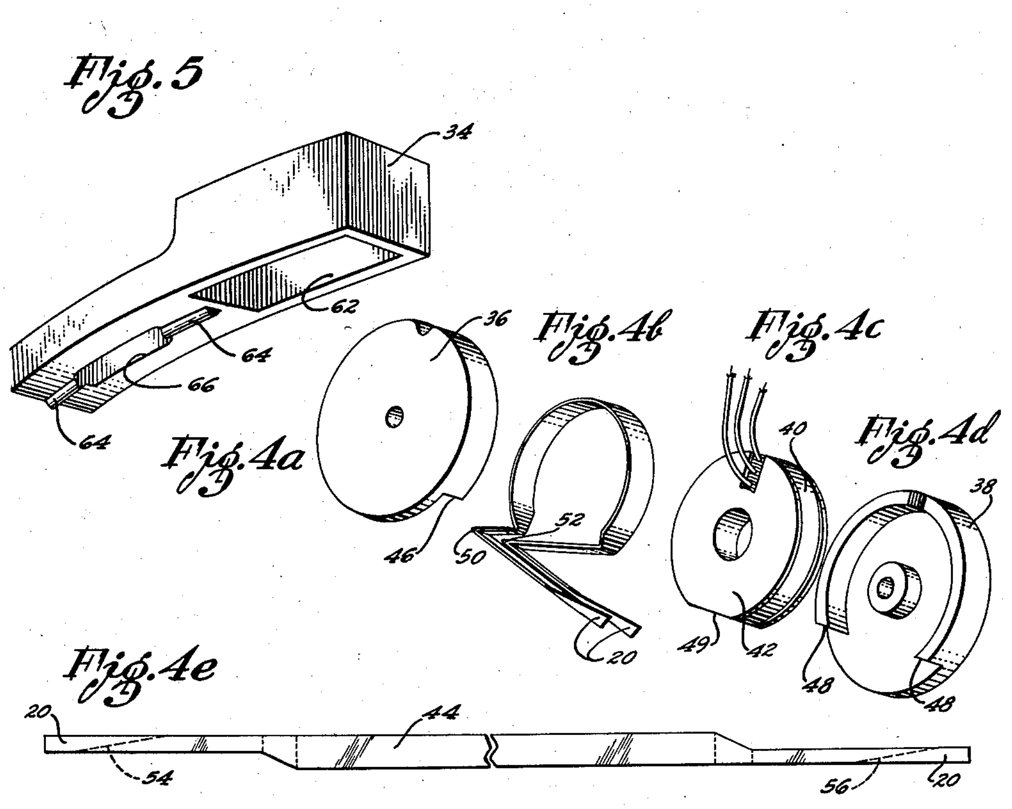

In the fabrication of the transducer a portion of the lateral periphery of two conventional ferrite cup-cores is first ground away, as at points 46 and 48, to provide an exit aperture for the secondary winding as described below. The next step to to flatten the periphery of bobbin 42 at a point 49 opposite the region from which the primary winding's electrical conductors are taken. The primary winding is then wound on the bobbin after which a blank of conductive resilient material, such as the blank shown in Fig. 4*e*, is wrapped around the outer surface of the bobbin to provide the requisite transformer secondary winding, the blank being bent sharply along the dotted lines shown in Fig. 4*e* so that its final configuration is that of the secondary winding 44 shown in Fig. 4*b*. It should be noted in Fig. 4*b* that the ends of the secondary winding are bent at points 50 and 52 and are then parallel and in the same plane for a short distance, thereafter the ends 20 of the secondary winding are folded over on the dotted lines 54 and 56 in Fig. 4*e*, and finally terminate as a pair of parallel planes which are spaced from each other.

After the primary and secondary windings have been placed in the two mating cup-cores, the assembly of the cup-core transformer is completed by cementing a phenolic insulator 58 across the open lower end of the cup-cores, as shown in Fig. 3, after which the entire transformer is positioned in transducer mounting bracket 34 and cemented therein. One material which has been found satisfactory for this operation is commercially available under the name Epon Adhesive number six, from the Shell Chemical Corporation of New York, New York. The three electrical conductors from the transformer primary winding are now threaded through three respectively associated hollow terminals in an insulating terminal board 60, the terminal board thereafter being cemented into the top of the transducer mounting bracket. The primary winding conductors are then soldered to their respective terminals.

Before proceeding with the remaining steps in the fabrication of the contact transducer of the invention, consideration will first be given to the details of the transducer mounting bracket 34 and the manner in which it assures automatic track alignment of the transducer of which it forms a part. With reference now to Fig. 5, the transducer mounting bracket includes a rectangular aperture 62 at one end for receiving the cup-core transformer, and a protruding tab or tongue 64 at the other end adapted to seat in the previously described peripheral slots in the transducer mounting stations of the magnetic drum assembly, and thereby assure proper track alignment of the transducer. In addition, the left hand end of the mounting bracket, as viewed in Fig. 5, also includes a slot 66 through which a bolt, not dsignated, is passed to stake the transducer to the preselected transducer mounting station, as shown in Fig. 1. Slot 66 thereby enables circumferential movement of the transducer so that the spacing between adjacent transducers on the same drum track, as in a circulating register for example, may be precisely controlled.

Figure 6A:
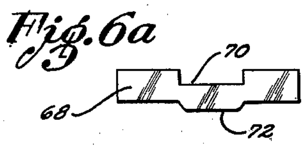

Returning now to the description of the transducers of the invention and the methods employed in their construction, the structure of the active recording head 18 will now be described with reference to Figs. 6*a* through 6*f*. Referring now with particularity to Fig. 6*a* there is shown a blank 68 of conductive material which is to be employed as a single-turn conductor for electrically energizing the contact head and for spacing the recording gap, the blank preferably being composed of a good conductor, such as copper, and being of the order of one-mil in thickness. As indicated by the drawing, the top of the blank is reduced in the central region, as shown at 70, while the lower edge of the blank preferably includes a tab 72 in the central region.

Figure 6B:
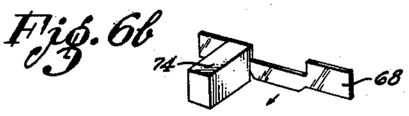
Figure 6C:
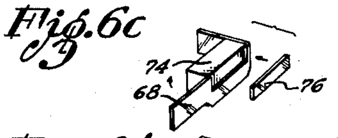
Figure 6D:
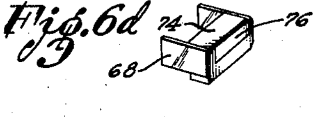
Figure 6E:
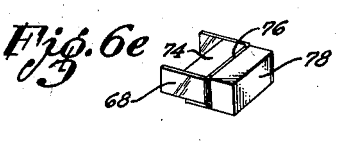

In the fabrication of the recording head, blank 68 is first placed against one side of a rectangular ferrite block 74, as shown in Fig. 6*b*, and is then wrapped around the block, as shown in Figs. 6*c* and 6*d*, so that the reduced central region of the blank faces on the front surface of block 74. A relatively small strip 76 of one-mil magnetic material, such as supermalloy, is then inset into the reduced central region of blank 68, after which a second rectangular ferrite block 78 is pressed firmly against the region of the blank opposite ferrite block 68, as shown in Fig. 6*e*. Thus it will be seen that ferrite blocks 74 and 78 and strip 76 form a U-shaped ferromagnetic core with the central region of conductor 68 filling the gap therein. A small daub of a suitable cement, such as epoxy resin, may then be placed on the top of the combination to hold the two ferrite blocks, together with copper blank 68, and supermalloy strip 76, in their assembled position.

In order to aid in an understanding of the invention and to better appreciate the ability of the recording head, when assembled as part of the transducer, to withstand extremely high accelerations and still maintain continuous engagement with the drum periphery, consider briefly the dimensions of a typical assembled head as shown in Fig. 6*e*. The length, width and depth of the head are all approximately $\frac{1}{16}$ of an inch, the total volume of the head being of the order of .00035 cubic inch. Consequently, the mass of the head is of the order of 0.2 gram, and it will therefore be recognized that if a relatively small spring force of 2 grams is employed to maintain the head in engagement with the drum surface, an acceleration in excess of 10 gravities will be required to lift the head off the drum surface. It may be shown that for even high speed drums operating in the range of 6000 r.p.m., a relatively large amount of run-out or eccentricity is required to even approach an acceleration of this magnitude, and it follows, therefore, that the transducers of the invention eliminate the prior art requirement that magnetic drums be machined with extraordinary precision.

Figure 6F:
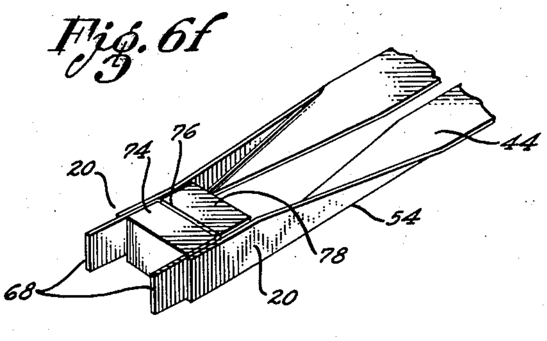

Returning now to the description of the figures, as a final step in the assembly of the transducer, the recording head of Fig. 6*e* is placed between the cantilevered ends 20 of the transformer secondary winding, as shown in Fig. 6*f*, whereafter the parallel planar ends of the transformer secondary winding are soldered to the ends of copper blank 68. It should be noted that the head assembly is soldered in place with the supermalloy strip uppermost, or in other words on the cup-core transformer side of the head so that the central tab 72 on the blank 68 is either flush with or projects slightly beyond the surface of the recording head which engages the associated magnetic drum periphery.

As one of the final production processes, the assembled transducer should be placed in a suitable jig or fixture, and an abrasive surface approximately the curvature of the drum should be employed to grind and polish the contact surface of the head to insure proper engagement of the transducer when the transducer is subsequently mounted in contact with a drum memory. At the conclusion of this operation the copper blank between the ferrite blocks is flush with the polished surface of the ferrite, and serves to accurately space the blocks from each other as well as to provide a path for electrically energizing the recording head.

As part of the final adjustments to the transducer the cantilever springs holding the recording head should be properly tensioned so that the head, when mounted in contact with its associated drum, will be stressed thereagainst with the proper force. The amount of force employed to hold the head against the drum is determined, of course, in view of several parameters, namely, the accelerations to which the head will be subjected if it is maintained in constant engagement with the adjacent drum surface, the mass of the head, and the requirement that the head should not cause any appreciable wear on the magnetizable surface of the drum. It has been found that recording heads whose mass is of the order of .02 gram may be stressed against the drum with a force of 2 grams, as previously mentioned, without any deleterious effect on the drum surface over extended periods of operation.

It will be recalled that the transducers of the invention also provide several significant electrical advantages, namely, high electrical efficiency and exceptionally high resolution. To better comprehend these advantages and the reasons therefor, reference is made to Fig. 7, which is a cross-sectional view taken through the recording head illustrating the operational relationship of the ferrite blocks 74 and 78 to the energizing conductor 68 and the supermalloy insert 76.

In operation, the electrical current induced in the transducer's secondary winding flows through element 68 alternately into and out of the plane of the drawing. Moreover, it may be shown that substantially all of the current flows through the lower part of the conductor adjacent the drum, the reason being that while the ferrite blocks and supermalloy strip are high permeability materials, the magnetizable drum surface has a permeability only 2 or 3 times that of air. Consequently the upper portion of the conductor behaves as an inductive reactance, this effect decreasing and reaching a minimum at the front gap of the head so that the portion of the conductor contiguous with the drum has the lowest impedance per increment of cross-sectional area per unit length.

The effect of this low permeability of the drum surface and of the effective compression of current at the front gap is then twofold. Firstly, almost all of the magnetic flux field generated by the energizing current must pass through the drum surface on its passage from ferrite block to ferrite block, since a priori the flux must encircle the current which creates it. It follows therefor that the electrical efficiency of the head is exceptionally high with very little of the magnetic field lost through flux fringing across the conductor above the recording gap. Secondly, the fact that the magnetizable drum surface has a relatively low permeability permits the magnetic flux linking the drum to concentrate in the region immediately adjacent the front gap of the head, since this is by far the lowest reluctance presented to the magnetomotive force. Consequently, the resolution provided by the head is exceptionally high, and in fact as many as 600 dipoles per inch have been recorded on the drum surface without appreciable attenuation of the playback signal.

It will be recognized of course, that the maximum information content recordable on the drum surface by the transducers of the invention is dependent upon the type or mode of recording utilized in storing the information. For example, if the transducer is employed in a digital computer wherein the Ferranti recording system is utilized, 600 dipoles per inch corresponds to a bit density of 300 bits per inch since in the Ferranti system two oppositely polarized magnetic dipoles are used to represent each bit. It should be noted, however, that this figure still represents an improvement of three or better over existing recording schemes, wherein only 50 to 100 bits are recordable per inch even though only one magnetic cell or dipole is used to represent each recorded information bit.

It should be pointed out that although the transducers utilized with the magnetic drum memories of the invention are shown to include a transformer for energizing the recording head, it is obvious that the cantilevered springs could be connected to a pair of terminals on the transducer mounting bracket from which the head could be energized by direct current signals. The need for a transformer would thus be eliminated although the output impedance of the source employed for energizing the record head would have to be relatively low to match the low impedance of the single-turn conductor which creates the magnetic field in the head.

It should also be pointed out that the basic principles of the invention may be incorporated in modified forms of the transducer thus far shown and described. With reference to Figs. 8*a* through 8*c*, for example, there is shown another embodiment of the transducer of the invention wherein the cup-core transformer assembly 32 is substantially identical with the assembly shown previously in Fig. 3, the principal difference being in the structure of recording head 18 and the manner in which it is spring-loaded and electrically energized.

More specifically, recording head 18 is here mounted on only one cantilever spring, designated 80, which constitutes one end of a transformer secondary winding fabricated from beryllium copper. The other end of the secondary winding is soldered to a one-mil metallic strip 82, such as copper, which is affixed to the opposite end of head 18. As shown in Fig. 8*b*, the single-turn conductor of the recording head is here bent around ferrite blocks 74 and 78 in the form of an S, the left hand side of the head being affixed, as by solder, to cantilever spring 80 which also serves as one of the electrical conductors to the head. It will be recognized, of course, that copper strip 82 and the single-turn energizing conductor for the head may be formed integrally as a single copper blank, as shown in Fig. 8*c*. It will be noted from Fig. 8*c* that the portion of the blank which is used to separate the ferrite blocks is cut away on its uppermost surface to receive a ferromagnetic insert as previously described with regard to the recording head shown in Fig. 6.

Still another embodiment of the transducer of the invention is shown in Figs. 9*a* and 9*b*, the transducer again including a cup-core transformer 32 and an S-shaped single-turn conductor separating ferrite blocks 74 and 78, in the same manner described hereinabove with respect to the embodiment of Fig. 8. Again, the principal distinction between this transducer and the preferred embodiment of the invention heretofore described is in the manner in which recording head 18 is cantilevered on the ends of the transformer's secondary winding, the head here being affixed, as by soldering, to the opposite ends of the secondary winding which in turn provide a pair of combined cantilever spring mounts and electrical conductors located on opposite sides of the head.

In each of the modified embodiments of the invention shown in Figs. 8 and 9 the same mechanical and electrical advantages are provided was were previously discussed in detail in connection with Figs. 1 through 7. The embodiments of Figs. 3 and 8 do have one advantage over the embodiment of Fig. 9, however, and that is that a pair of these units may be utilized back-to-back to provide an exceptionally short recirculating register on the associated magnetic drum. For example, it has been found that two of these transducers may be operated reliably back-to-back with a spacing of only one tenth of an inch between the gap of the read head and the gap of the write head, and with substantially no cross-talk between the transducer heads.

It is to be expressly understood, of course, that the basic concepts herein taught may be embodied in structures different from the specific structures shown without departing from the spirit and scope of the invention. For example, the transducer of the invention may be modified, as previously indicated, so that it may be energized from a source of direct current signals. On the other hand, if transformer coupling is desired, a transformer other than the specific type shown and described could be employed without departing from the invention. Accordingly it is to be understood that the spirit and scope of the invention is to be limited only by the scope of the appended claims.

What is claimed as new is:

1. In a magnetic memory system, the combination comprising: a rotatable drum having a magnetizable periphery; frame means positioned adjacent said drum; means mounted on said frame means for rotating said drum; a plurality of transducer mounting stations connected to said frame means and spaced around said drum, said stations being contiguous with said magnetizable periphery of said drum; each of said transducer mounting stations including at least one peripheral groove paralleled to the direction of travel of said magnetizable periphery of said drum; a magnetic transducer including a transducer mounting bracket, a recording head, and spring means connected to said bracket for urging said head against the magnetizable periphery of said drum, said mounting bracket including a projecting guide tab slideably engageable in said groove in said transducer mounting stations; and means for adjustably fastening said transducer to a preselected one of said transducer mounting stations with said guide tab engaging said groove whereby said recording head is automatically positioned radially and axially on said drum and is circumferentially adjustable with respect thereto.

2. In a magnetic drum memory system including a rotatable drum having a magnetizable periphery, a combination for automatically aligning a recording head axially and radially with respect to the drum, said combination comprising: a transducer mounting station positioned adjacent the periphery of said drum, said station having a peripheral groove therein lying in the same plane as a circumferential reference circle on said drum periphery; a transducer mounting bracket including a guide tab slideably engageable in said groove; conductive spring means coupled to said bracket for electrically energizing the recording head and mechanically spring loading the head against the magnetizable periphery of said drum; and means for fastening said transducer mounting bracket to said transducer mounting station to control the circumferential position of the recording head about said drum.

3. In a high efficiency and high resolution magnetic transducer for reading or writing intelligence information in the form of magnetic cells on the low permeability surface of a magnetic drum, the combination comprising: a magnetic head including a ribbon-like blank of conductive material having first and second ends and a central region, a strip of high permeability ferromagnetic material in edgewise abutting engagement with the central region of said blank, and first and second ferrite specimens sandwiching said strip and said central region of said blank therebetween; a resilient electrical conductor connected to said first end of said conductive blank; and an electrically conductive cantilever spring electrically connected to said second end of said conductive blank and mechanically coupled to said head for spring loading said head against the surface of the magnetic drum.

4. A single-turn contact head for magnetically writing or reading intelligence information in the form of magnetic cells on the magnetizable periphery of a rotatable drum, said contact head comprising: a high permeability U-shaped ferromagnetic core, the legs of said core being spaced apart by a distance of the order of one-thousandth of an inch; a ribbon-like electrical conductor substantially filling the space between the legs of said core and having first and second ends extending out of said core at opposite ends thereof; a pair of conductive cantilever springs mechanically coupled to said core for urging said core against the periphery of the drum, said pair of springs being electrically connected to said first and second ends of said ribbon-like conductor, respectively; and means for impressing across said pair of cantilever springs a signal to be recorded whereby said ribbon-like conductor conducts an energizing current which creates a magnetic flux field through said core and the periphery of the drum in contact therewith.

5. In a magnetic drum memory system including a rotatable drum having a magnetizable surface for storing as magnetic cells applied electrical signals representative of intelligence information, a magnetic transducer comprising: an electrical transformer having a primary winding and a secondary winding; means for impressing the applied electrical signals to said primary winding; a recording head including first and second electrical terminals and conductive means therebetween, said head being responsive to signals across said terminals for producing a magnetic field; a conductive resilient spring cantilevered at one end to said transformer and coupled at its other end to said head for urging said head against the magnetizable surface of the drum, said spring electrically intercoupling one side of said secondary winding to said first terminal; and means for electrically interconnecting the other side of said secondary winding to said second terminal on said head.

6. The transducer defined in claim 5 wherein said transducer comprises a cup-core transformer, and wherein said secondary winding is a continuation of said conductive resilient spring.

7. The transducer defined in claim 5 wherein said last-named means comprises a second conductive resilient spring cantilevered at one end to said transformer and mechanically coupled at its other end to said head for aiding in urging said head against the magnetizable surface of the drum.

8. The transducer defined in claim 7 wherein said transformer comprises a cup-core transformer and said secondary winding is an integral continuation of said conductive resilient springs.

9. The transducer defined in claim 8 wherein said conductive resilient springs are cantilevered to said transformer adjacent each other and are substantially parallel to each other over substantially their entire length.

10. The transducer defined in claim 8 wherein said conductive resilient springs are cantilevered to said transformer from the circumferentially spaced points on the periphery thereof, said springs being cantilevered in opposite directions to suspend said head symmetrically with respect to said springs and said cup-core transformer.

11. In a high efficiency and high resolution magnetic transducer for reading or writing intelligence information in the form of magnetic cells on the low permeability magnetizable surface of a magnetic drum, the combination comprising: a magnetic head including a relatively thin blank of conductive material having first and second ends and a central region, and first and second ferrite specimens sandwiching said central region of said blank therebetween; transducer mounting means; an electrically conductive spring cantilevered from said mounting means and electrically connected to said first end of said conductive blank and mechanically coupled to said head for applying a substantial spring force to said core for spring loading said head against the surface of the magnetic drum, and an electrical conductor interconnecting said second end of said conductive blank with said mounting means.

12. A single-turn contact head for magnetically recording and reading intelligence information in the form of magnetic cells on the relatively low permeability magnetizable periphery of a rotatable drum, said contact head comprising: a high permeability U-shaped ferromagnetic core; a ribbon-like electrical conductor wedged in the gap in said core and having first and second ends extending out of said core at opposite ends thereof; a mounting bracket; a pair of conductive springs cantilevered from said mounting bracket and mechanically coupled to said core for urging said core against the periphery of the drum, said springs providing the principal force for urging said core against the drum, said pair of springs being electrically connected to said first and second ends of said ribbon-like conductor, respectively; and means for impressing across said pair of cantilever springs a signal to be recorded whereby said ribbon-like conductor conducts an energizing current which creates a magnetic flux field through said core and the periphery of the drum in contact therewith.

13. In a magnetic drum memory system including a rotatable drum having a magnetizable surface for storing as magnetic cells applied electrical signals representative of intelligence information, a magnetic transducer comprising: a cup-core transformer having a primary winding and a secondary winding; said secondary winding comprising a flat conductive strip forming one turn within said transformer and having first and second ends extending out of said transformer; means for impressing the applied electrical signals to said primary winding; a recording head including first and second electrical terminals and conductive means therebetween, said head being responsive to signals across said terminals for producing a magnetic field; a conductive resilient cantilever spring formed of said first end of said secondary winding mechanically coupled to said head for urging said head against the magnetizable surface of the drum, said spring being electrically connected to said first terminal; and means for electrically interconnecting the other side of said secondary winding to said second terminal on said head.

14. The transducer defined in claim 13 wherein said last named means comprises a solder connection between said second terminal on said head and said second end of said secondary winding, said second end of said secondary winding forming a second cantilever spring for mechanically urging said head against the drum.

15. In a magnetic drum memory system including a rotatable drum having a magnetizable surface for storing as magnetic cells applied electrical signals representative of intelligence information, a magnetic transducer comprising: transducer mounting means positioned adjacent the magnetizable surface of the drum; a recording head including first and second electrical terminals and conductive means therebetween, said head being responsive to signals applied across said terminals for producing a magnetic field; a conductive resilient spring cantilevered at one end to said mounting means and mechanically connected at its other end to said head for urging said head against the magnetizable surface of the drum, said spring being electrically connected to said one terminal; and an electrical conductor connected to said second terminal on said head and operative in conjunction with said cantilever spring for applying electrical signals to the head.

16. The combination defined in claim 15 wherein said electrical conductor comprises a second conductive resilient spring cantilevered at one end to said mounting means and mechanically connected at its other end to said head for aiding in urging said head against the magnetizable surface of the drum.

17. In a magnetic drum memory system including a rotatable drum having a magnetizable surface for storing as magnetic cells applied electrical signals representative of intelligence information, a magnetic transducer comprising: transducer mounting means positioned adjacent the magnetizable surface of the drum; a single-turn recording head comprising a ferromagnetic core having a gap therein, and an electrical conductor substantially filling said gap and having first and second ends extending out of said core on opposite sides thereof; and spring means for resiliently holding said recording head against the magnetizable surface of the drum and for applying the electrical input signals across first and second ends of said conductor.

References Cited in the file of this patent

UNITED STATES PATENTS

| | | |
|---|---|---|
| 2,694,192 | Dean et al. | Nov. 9, 1954 |
| 2,705,640 | Del Valle | Apr. 5, 1955 |
| 2,772,135 | Hollabaugh | Nov. 27, 1956 |
| 2,802,905 | Taris | Aug. 13, 1957 |
| 2,806,757 | Cunningham | Sept. 17, 1957 |
| 2,820,688 | Philbrick | Jan. 21, 1958 |
| 2,838,614 | Ashby et al. | June 10, 1958 |